US012097605B2

(12) United States Patent
Petursson et al.

(10) Patent No.: US 12,097,605 B2
(45) Date of Patent: *Sep. 24, 2024

(54) ADAPTER FOR A ROTARY DEVICE

(71) Applicant: Ossur Iceland ehf, Reykjavik (IS)

(72) Inventors: Valgeir Petursson, Reykjavik (IS); Stefan Orn Stefansson, Reykjavik (IS); David Sandahl, Reykjavik (IS)

(73) Assignee: OSSUR ICELAND EHF, Reykjavik (IS)

( * ) Notice: Subject to any disclaimer, the term of this patent is extended or adjusted under 35 U.S.C. 154(b) by 217 days.

This patent is subject to a terminal disclaimer.

(21) Appl. No.: 17/703,258

(22) Filed: Mar. 24, 2022

(65) Prior Publication Data

US 2022/0212333 A1 Jul. 7, 2022

Related U.S. Application Data

(63) Continuation of application No. 16/811,251, filed on Mar. 6, 2020, now Pat. No. 11,311,997.

(60) Provisional application No. 62/944,793, filed on Dec. 6, 2019, provisional application No. 62/815,086, filed on Mar. 7, 2019.

(51) Int. Cl.

| | |
|---|---|
| ***B25G 1/00*** | (2006.01) |
| ***B25G 1/10*** | (2006.01) |
| ***B25G 3/14*** | (2006.01) |
| *A43C 11/16* | (2006.01) |

(52) U.S. Cl.

CPC ............ *B25G 1/002* (2013.01); *B25G 1/102* (2013.01); *A43C 11/165* (2013.01); *B25G 3/14* (2013.01)

(58) Field of Classification Search

CPC B65H 75/30; B65H 75/4418; B65H 75/4434; B25G 1/005; B25G 1/102; B25G 3/14; B25G 1/002; A43C 11/165

See application file for complete search history.

(56) References Cited

U.S. PATENT DOCUMENTS

| | | | | | |
|---|---|---|---|---|---|
| 2,725,086 | A | * | 11/1955 | Keyes | B25B 23/16 81/177.2 |
| RE24,999 | E | * | 6/1961 | Kirsten | H03J 1/14 74/553 |
| D233,138 | S | * | 10/1974 | Vogel | D9/453 |
| D271,843 | S | * | 12/1983 | Ferdinand | D8/312 |
| D271,937 | S | * | 12/1983 | Combs | D23/250 |
| 4,433,456 | A | * | 2/1984 | Baggio | A43C 11/165 24/71.1 |
| D274,973 | S | * | 8/1984 | Waller | D8/21 |
| 4,593,892 | A | * | 6/1986 | Terstegge | B25B 13/04 269/244 |
| 4,660,302 | A | * | 4/1987 | Arieh | A43C 11/004 24/274 R |
| 4,699,020 | A | * | 10/1987 | Bush | B25G 1/002 74/544 |
| D324,630 | S | * | 3/1992 | Moeller | D8/21 |
| D329,178 | S | * | 9/1992 | Ackerman | D8/21 |

(Continued)

*Primary Examiner* — Jeffrey O'Brien

(74) *Attorney, Agent, or Firm* — Workman Nydegger

(57) ABSTRACT

An adapter is arranged to secure to a rotary device. The adapter includes a handle rotatable about an axis, and a coupler extending from and coaxial with the handle. The coupler is adapted to engage the rotary device via traction elements for simultaneously rotating the rotary device and the handle.

12 Claims, 7 Drawing Sheets

(56) References Cited

U.S. PATENT DOCUMENTS 5,310,074 A * 5/1994 Jochem .................. B65D 50/04 220/296
D371,298 S * 7/1996 Reddy .......................... D15/140
5,606,778 A * 3/1997 Jungkind ............. A43C 11/165 24/68 SK
D422,255 S * 4/2000 Gonzales ..................... D12/197
6,186,475 B1 * 2/2001 Selepouchin ........... F16K 31/46 251/293
6,363,579 B1 * 4/2002 King, Jr. ............... F16K 31/607 16/433
6,502,286 B1 * 1/2003 Dubberke ................ A43C 7/00 24/712.1
6,513,200 B2 * 2/2003 Yang ........................ G05G 1/10 16/422
D488,397 S * 4/2004 Morelock ...................... D10/68
D503,667 S * 4/2005 Keefer ......................... D12/197
6,886,585 B1 * 5/2005 King Jr. ................... G05G 1/10 74/543
6,922,870 B2 * 8/2005 Tontz, Sr. .............. B25G 1/005 81/177.4
D524,613 S * 7/2006 Chen ................................ D8/21
D556,007 S * 11/2007 Hung ............................. D8/107
7,367,522 B2 * 5/2008 Chen ........................ A43C 7/00 242/378.1
D579,332 S * 10/2008 Krivoshein .................... D9/453
D585,348 S * 1/2009 Yan .............................. D12/197
7,513,018 B2 * 4/2009 Koenig ................. B60P 7/0823 224/259
7,591,050 B2 * 9/2009 Hammerslag .......... A43C 11/00 36/50.5
D622,563 S * 8/2010 Stindel ............................. D8/21
8,235,321 B2 * 8/2012 Chen .................... A43C 11/008 242/378.1
8,245,371 B2 * 8/2012 Chen ...................... A43C 11/16 24/713.2
8,308,098 B2 * 11/2012 Chen .................... A43C 11/008 242/378.1
8,353,087 B2 * 1/2013 Chen .................... A43C 11/165 24/68 SK
8,832,912 B2 * 9/2014 Ha ....................... A43C 11/165 24/712.9
D718,586 S * 12/2014 Jiang ................................ D8/25
D756,280 S * 5/2016 Davito ......................... D12/197
9,597,786 B2 * 3/2017 Romo ................. B25B 23/1415
9,706,814 B2 * 7/2017 Converse .............. A61F 5/0123
9,770,070 B2 * 9/2017 Cotterman ........... A43C 11/165
D799,962 S * 10/2017 Steel .............................. D9/453
9,918,865 B2 * 3/2018 Nickel ...................... A61F 5/01
D814,390 S * 4/2018 Eriksson ........................ D8/311
D816,494 S * 5/2018 Candelaria ..................... D9/437
9,968,473 B2 * 5/2018 Mason ................. A43C 11/165
D823,905 S * 7/2018 Walters ........................ D15/135
10,039,345 B2 * 8/2018 Ha ..................... B65H 75/4431
10,258,109 B2 * 4/2019 Midorikawa .......... A43B 23/02
10,264,852 B2 * 4/2019 Kim ..................... A43C 11/165
10,287,122 B2 * 5/2019 Walters ................. B65B 67/085
D850,911 S * 6/2019 Holmes .......................... D9/443
10,368,613 B2 * 8/2019 Ha ........................... A43C 7/00
10,383,403 B2 * 8/2019 Modena ................. A43C 1/003
10,384,337 B2 * 8/2019 Ashmead ................. B25G 3/10
D858,231 S * 9/2019 Larsson ........................... D8/21
10,470,525 B2 * 11/2019 Chen .................... A43C 11/165
10,512,305 B2 * 12/2019 Omarsson ................. A61F 5/01
10,550,553 B1 * 2/2020 Pankey ................. E03C 1/0412
D877,816 S * 3/2020 Takahashi .................... D21/460
10,617,546 B2 * 4/2020 Turrini .................. A61F 5/0111
10,842,230 B2 * 11/2020 Pollack .............. B65H 75/4492
10,849,390 B2 * 12/2020 Hammerslag ........ A43B 5/1666
D910,412 S * 2/2021 Petursson ...................... D8/312
10,918,165 B2 * 2/2021 Chen ...................... A43C 11/00
10,919,140 B2 * 2/2021 Tsai ........................ B25B 23/16
10,952,505 B2 * 3/2021 Hammerslag .......... A43C 11/16
10,993,504 B1 * 5/2021 Li ........................ A43C 11/165
11,026,479 B2 * 6/2021 Schnedler ................ A43C 7/00
11,040,845 B2 * 6/2021 Walters .................. B65H 75/30
2002/0059695 A1 * 5/2002 Yang ........................ G05G 1/10 16/441
2002/0095750 A1 * 7/2002 Hammerslag ............ A43B 5/16 24/68 SK
2006/0021204 A1 * 2/2006 Young ...................... A43C 7/00 24/712.4
2014/0110616 A1 * 4/2014 Freeth ................... F16K 35/027 251/288
2014/0123449 A1 * 5/2014 Soderberg ............. A43C 1/003 24/712.1
2015/0191326 A1 * 7/2015 Hall ................... B65H 75/4431 242/396.4
2017/0348131 A1 * 12/2017 Petursson ............. A61F 5/0123
2018/0228636 A1 * 8/2018 Mason .................. A61F 5/0123
2018/0319617 A1 * 11/2018 Kim ..................... A44B 11/125
2019/0184543 A1 * 6/2019 Hart-Meyer ........... B25G 1/102
2020/0268108 A1 * 8/2020 Fiedler ............... A45C 13/1069
2020/0337418 A1 * 10/2020 Chen .................... A43C 11/165
2020/0345107 A1 * 11/2020 Burt ....................... A43C 17/02
2020/0346888 A1 * 11/2020 Kruse .................... B65H 75/30
2021/0030119 A1 * 2/2021 Kim ..................... A43C 11/165
2021/0127794 A1 * 5/2021 Chen ...................... A43C 11/06
2021/0127795 A1 * 5/2021 Chen ...................... A43C 11/06

* cited by examiner

ADAPTER FOR A ROTARY DEVICE

FIELD OF THE DISCLOSURE

The disclosure relates to an adapter for securing to a rotary device, and more particularly to an adapter having a handle ergonomically facilitating rotation of the rotary device and adapting components upon which the rotary device is secured for minimizing rotational forces exerted thereon.

BACKGROUND

Use of a rotary device for tightening a lace, cable, or other elongate element is becoming more commonplace in numerous applications including sports, workwear, medical applications, and footwear. As it is intended that rotary devices are low profile to integrate with articles and replace original or traditional means for tightening, including laces, straps, or other suitable elongate elements, these rotary devices come at a sacrifice to individuals having poor dexterity, vision, or otherwise finding it difficult to regulate the rotary device.

An example of a rotary device for tightening a lace is provided by BOA Technology Inc. of Denver, CO, as described in U.S. Pat. No. 7,591,050, issued Sep. 22, 2009, and incorporated herein in its entirety by reference. As shown in FIG. 1, the rotary device 10 includes a base member 16 mountable onto an article and arranged to receive a lace 24 or other elongate tensioning element. A knob 14 is provided in combination with the base member 16 and used to regulate tension and wind the lace 24 within the rotary device 10. This knob 14 may be difficult to grasp or adjust due to its small size (i.e., a diameter of the knob 14) and height (i.e., an amount by which the rotary device 10 protrudes from the article). The knob 14 may comprise a top cap portion 20 and an outer cap portion 22.

In many applications, it is desirable that the rotary device 10 has a low profile and closely conforms to the article upon which it is mounted, constituting a small footprint over the article and minimizing inconveniences such as bulkiness or the knob 14 catching on clothing or other objects. However, this makes it challenging for an individual with poor dexterity to grasp and rotate the knob 14, even if the knob 14 is provided with traction elements 26 about its periphery or is constructed from a material offering improved gripping means, such as rubber. It may further be a challenge for a user to precisely regulate such a device to a desired degree of tension. Because of the low height of the rotary device 10, there may be little clearance from the article upon which it is mounted, making it difficult to grasp. Making the knob 14 larger compromises the size of the rotary device 10 and may defeat the purpose of using a rotary device.

Besides considerations of difficulty with grasping the knob and insufficient clearance from the base member, some individuals may have weakness in the hands or limited dexterity which prevents the individual from rotating the knob to tighten the laces. As disclosed in the orthopedic device of U.S. patent application publication 2017/0348131, published on Dec. 7, 2017, belonging to the assignee of the present disclosure and incorporated herein by reference, the rotary device is coupled to a cable routed about a network of guides to tension a strap about a leg. Considerable force may be required by the individual wearing the device to properly tension the strap from the rotary device and through the network of guides.

As rotational forces are transmitted to a component of the article by tensioning of a lace about the rotary device, it may be difficult to provide conventional portions of the article that can readily withstand such rotational forces without premature failure. Such forces may provide undue stress on the portions of the article, or cause the connection of the rotary device to shear from the article.

From the foregoing, there is a need for a tool that facilitates rotation of a rotary device by improved gripping of the rotary device for individuals with poor dexterity, increased clearance from the article upon which the rotary device is mounted for rotating the rotary device without compromising the convenience and effectiveness of providing a rotary device, and assistance for rotating the rotary device for individuals with impaired strength. There is also a need to adapt an article for rotational forces because of the activity of the rotary device to assure it can generally withstand such forces without a detrimental effect on its structure or function.

SUMMARY

Embodiments of the adapter for a rotary device of the disclosure overcome the shortcomings of known rotary devices by providing a coupler for improving the engagement of the rotary device and a handle for improved rotation of the rotary device, with the handle and the coupler together defining an adapter for a rotary device. The handle is preferably sized with a width or diameter greater than a knob on the rotary device, and the coupler and handle stack the adapter with greater clearance from an article upon which the rotary device is mounted.

The handle width or diameter allows for greater mechanical advantage when rotating the knob and can be provided with a grip that has improved ergonomics, particularly for an individual having poor dexterity. Because of the larger size, the handle may include indicia that make it more apparent as to the direction by which the handle should be rotated to wind an elongate element. In embodiments, the indicia may also provide an indication of a degree of rotation, helping a user to more accurately rotate the adapter to a desired or proper degree based on the rotary device.

The coupler may be provided with tractional elements and interior profiles that better engage the knob to facilitate grasping of the knob for rotation by the handle. The handle and coupler may be arranged with width and height features to optimize the regulation of the rotary device and engagement therewith. The handle and coupler are preferably arranged coaxially relative to one another and may be formed by a monolithic single mass of material that is integrally and continuously formed.

A connector may be arranged to couple a first component to a second component. The connector may have cooperating features to couple features of the first component and the second component. The connector may have material properties different from either of the first and second components. The cooperating features of the connector may form a snap-fit with a snapping action with the coupling features. For example, the cooperating features may be on opposite sides of the coupling features of corresponding first and second components, and counteract the coupling to both the first and second components. The counteracting coupling and snap-fit may occur as the connector is inserted between the coupling features.

A mounting system for mounting a rotary device onto a frame member of an article is provided with the connector to facilitate coupling and decoupling from the frame member. The connector enables removable and replaceable mounting of the rotary device to the frame member and eliminates adhesives, stitching or other means for securing the rotary device to the frame member. As the rotary device and frame member are not arranged to couple to one another, meaning that while they have cooperating coupling features, the connector enables locking the coupling features together to resist unintended demounting or decoupling of the rotary device from the frame member.

In another embodiment of the mounting system, a reinforcement plate is added to the connector to provide improved stability over the frame member. The reinforcement plate stiffens the attachment of the rotary device to the frame member to provide a robust connection, while still maintaining a low-profile yet flexible connection to the frame member, and without significant modification of the frame member structure.

These and other features, aspects, and advantages of the present disclosure will become better understood regarding the following description, appended claims, and accompanying drawings.

BRIEF DESCRIPTION OF THE DRAWINGS

The drawing figures are not necessarily drawn to scale, but instead are drawn to provide a better understanding of the components thereof, and are not intended to be limiting in scope, but to provide exemplary illustrations. The figures illustrate exemplary configurations of an adapter for a rotary device, and in no way limit the structures or configurations according to the present disclosure.

DETAILED DESCRIPTION OF VARIOUS EMBODIMENTS

Figure 1:
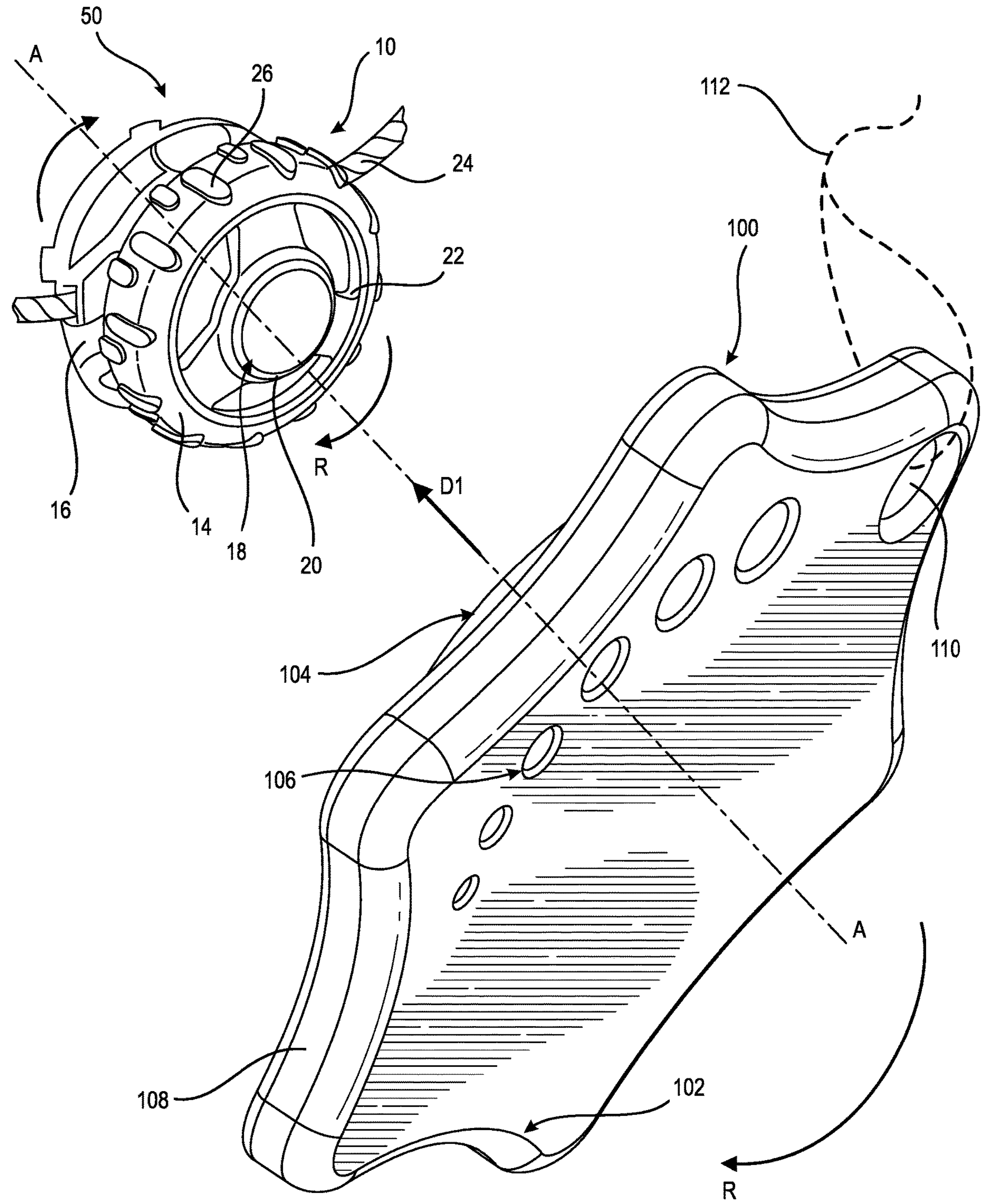
FIG. 1 is a schematic perspective view of a known rotary device on an article in combination with an embodiment of the adapter of the disclosure.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed; but on the contrary, the intention covers all modifications, alternative constructions, combinations, and equivalents falling within the spirit and scope of the disclosure.

FIG. 1 illustrates an adapter 100 arranged to secure to a rotary device 10 mounted on an article 50. The adapter 100 includes a handle 102 having a width greater than a knob 14 of the rotary device 10, and a coupler 104 extending from the handle 102 and adapted to engage the rotary device 10 and releasably interlock therewith. The coupler 104 is preferably coaxial with the handle 102 along an axis A-A of the adapter 100.

The handle 102 and the coupler 104 may be formed as a monolithic single mass of material integrally and continuously formed to define the handle 102 and the coupler 104. For example, the adapter 100 may be made from injection molding as the entire adapter 100 and its features are simultaneously molded as a single part. The adapter 100 can thereby be made at a low cost and provided with an article and/or rotary device as an accessory should it be needed to regulate a rotary device.

The handle 102 may define indicia 106 to indicate a rotational direction R for rotating the handle 102. For example, the indicia 106 may be printed or formed on the handle 102 in a conspicuous location for each indicium or identification. The indicia 106 may comprise a series of indentations, markings, raised features, or other indicia. The markings can have any suitable configuration, size, or pattern. In embodiments, the markings may have a similar shape and a pattern of the individual markings may provide a direction of rotation. For example, as the markings increase in size in a direction, a user may perceive that the direction is the rotation direction R. It will be understood that the depicted embodiment is merely exemplary and any suitable pattern, configuration, combination, or size of indicia may be provided.

Figure 5:
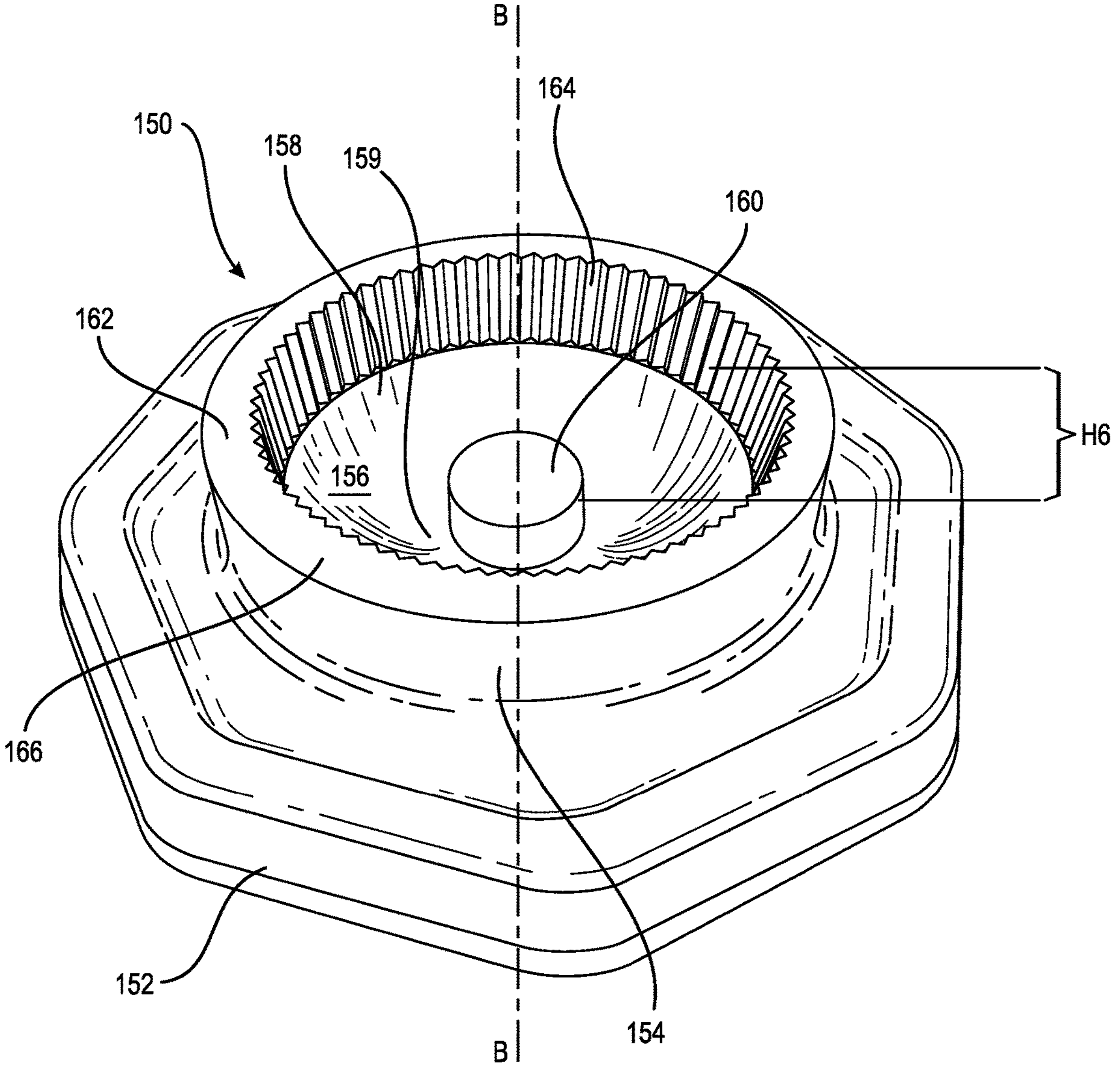
FIG. 5 is a perspective view of another embodiment of the adapter viewed from an engagement side of the adapter.

The handle 102 defines a profile forming a grip 108 about a periphery of the handle 102. As shown in FIG. 1, the grip 108 may be formed by a serrated profile. FIG. 5 shows another example wherein the grip 108 is formed by an alternating profile 153 about the periphery of the handle 102. Alternatively or in combination, the handle 102 may include traction means such as overmolded and/or elastomeric material having frictional properties greater than a remainder of the handle 102 or adjacent parts of the handle 102, or traction means may be applied onto the handle 102. The traction means may be any material that improves gripping ability over adjacent portions of the handle 102. The entirety of the adapter 100 may be formed from a high-friction material to facilitate gripping and actuating the rotary device 10.

The handle 102 may define at least one opening 110 arranged for receiving an attachment element 112. For example, the attachment element 112 may be formed as a cord or other element that can attach onto the article 50 or another item to retain the adapter 100 in close position for use, for example, if the adapter 100 is de-coupled from the rotary device 10.

Figure 2:
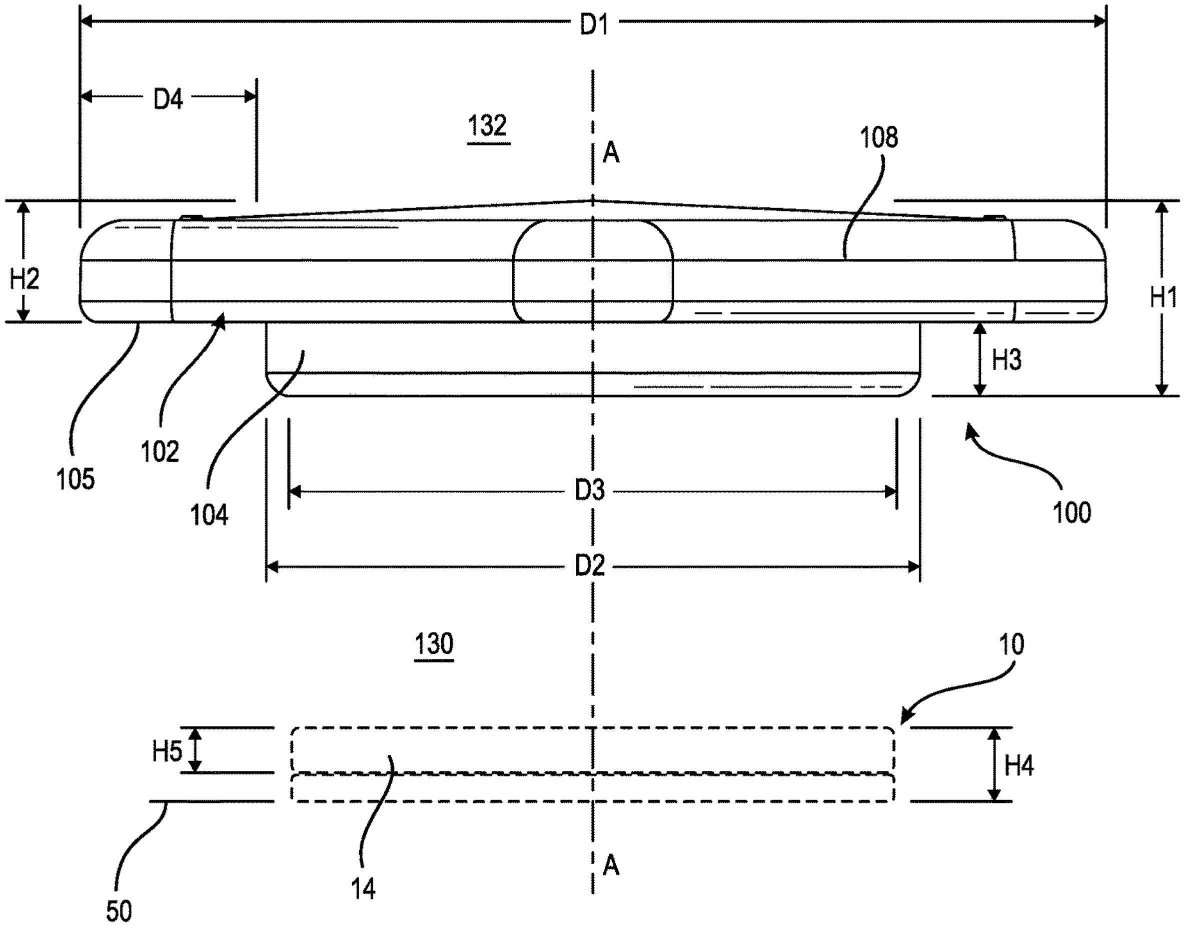
FIG. 2 is a schematic elevational view of the rotary device and adapter of FIG. 1.

FIG. 2 shows how relational and dimensional features of the adapter 100 are provided to improve engagement and facilitate the rotation of the rotary device 10. The handle 102 preferably has a diameter D1 greater than a diameter D2 of the coupler 104. The handle 102 may define a radial overhang 105 extending radially outwardly from the axis A-A and a distance D4 relative to the diameter D2 of the coupler 104. The handle 102 may also form an axial overhang 107 coaxially extending at least along the rim 116, as shown in FIG. 4.

The coupler 104 preferably has a diameter D2 greater than a diameter D3 of the rotary device 10. The handle 102 may have a height H2 greater than a height H3 of the coupler 104. The coupler 104 may have a height H3 greater than a height H5 of the rotary device 10. In embodiments, the adapter 100 may have a height H1 at least twice a height H5 of the rotary device 10.

Figure 3:
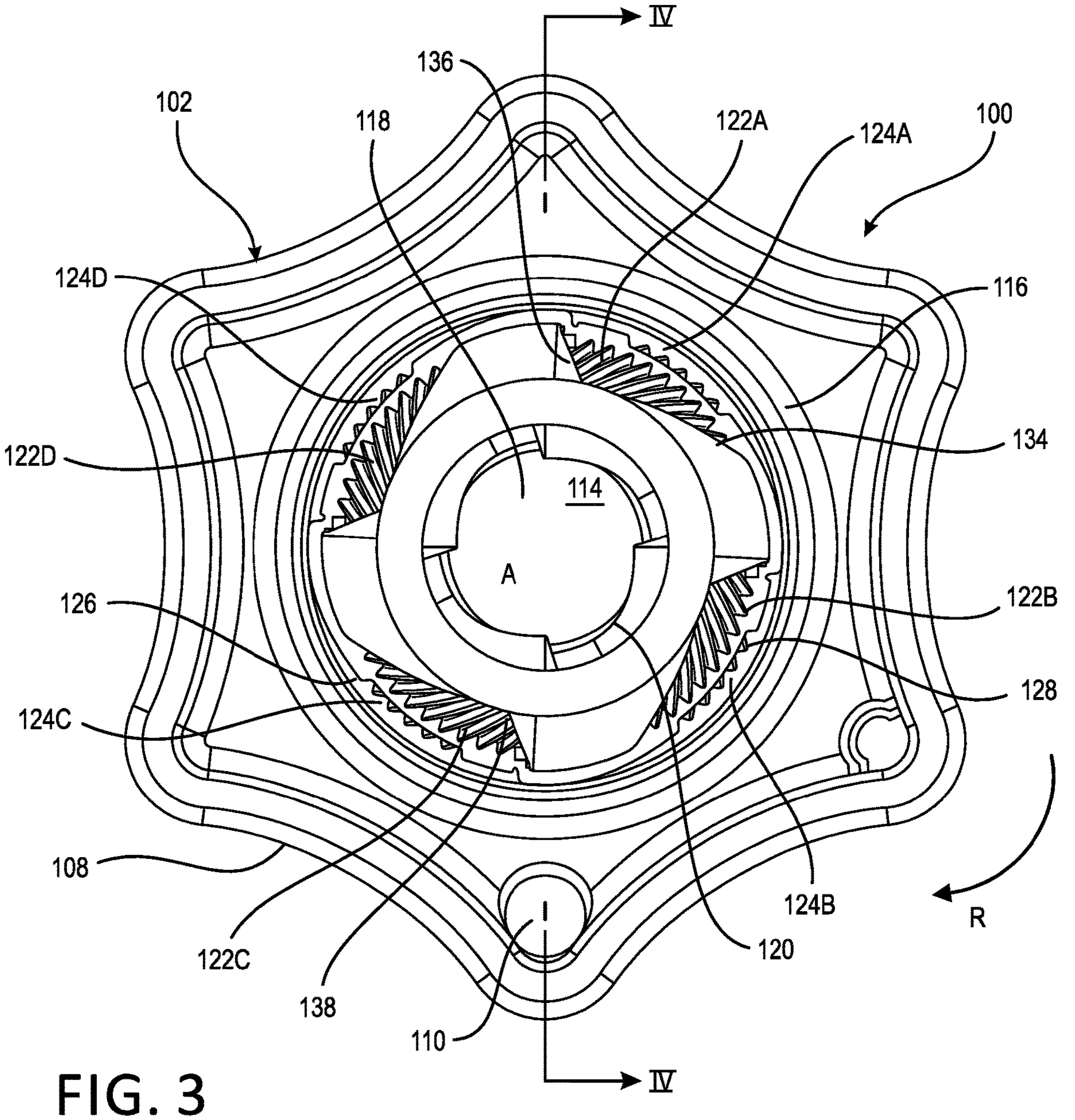
FIG. 3 is a plan view of the adapter of FIG. 1 viewed from an engagement side of the adapter.
Figure 4:
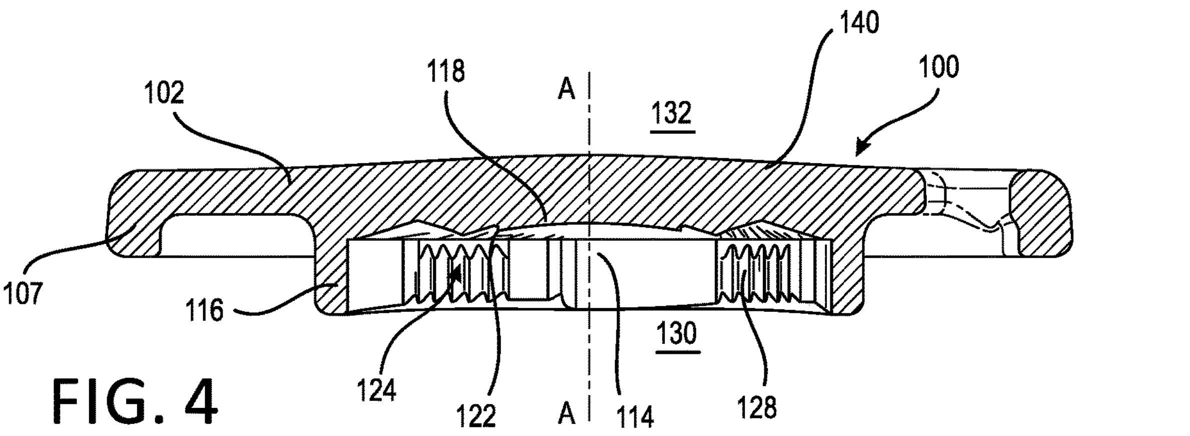
FIG. 4 is a cross-sectional view taken along line IV-IV of the adapter of FIG. 3.

FIGS. 3 and 4 show the adapter 100 defining a cavity 114 about the axis A-A and extending from an engagement side 130 into the adapter 100. The coupler 104 includes a rim 116 coaxial with the axis A-A and surrounding at least part of the cavity 114. The rim 116 preferably defines an outer diameter D2 of the coupler 104. The cavity 114 may have a diameter proximate or corresponding to the diameter D3 of the rotary device 10. In embodiments, the diameter of the cavity 114 is complementary to the diameter D3 of the rotary device 10, allowing the adapter 100 to releasably engage the rotary device 10 and effectively transfer forces, such as rotation forces, thereto. A height H3 of the rim 116 defines the height of the coupler 104.

The cavity 114 defines a top portion 118 extending at least into the handle 102 or within a height H2 of the handle 102. The top portion 118 of the cavity 114 may define a profile or recess 120 adapted to correspond or that is proximate in shape to a cap 20, 22 of the rotary device 10. The profile or recess 120 may be configured to interlock and create traction with a profile of the cap 20, 22, as shown with a profile of the recess 120 in FIG. 3. The top portion 118 of the cavity 114 may have an arcuate cross-sectional profile to accommodate the cap 20, 22 of the rotary device 10, or to provide clearance therefrom to minimize traction or interference when rotating the rotary device 10.

A periphery 120 of the cavity 114 may define a plurality of traction elements 122A-122D, generally extending radially and/or circumferentially relative to the axis A-A. The traction elements 122A-122D may taper in width in the rotational direction R. For example, the traction elements 122A-122D may taper in width toward a forward end 134 in the rotational direction R and may taper in width toward a rearward end 136. The traction elements 122A-122D may define a peak 138 extending toward the axis A-A proximate the rearward end 136.

The traction elements 122A-122D may extend through and be defined by or proximate the periphery 120 at a top surface of the cavity 114. The traction elements 122A-122D may be of a same material as the handle 102 and the coupler 104 or may comprise a different material. In embodiments, the traction elements 122A-122D are configured to engage frictionally a surface of the rotary device 102, for example a top surface, a corner surface between the top surface and a side surface, and/or a side surface of the rotary device 102.

The periphery 120 of the cavity 114 may further define a plurality of traction elements 124A-124D extending about the axis A-A along an inner periphery of the rim 116. The plurality of traction elements 124A-124D may extend along protruding portions extending radially toward the axis A-A about the inner periphery of the rim 116, for example, about a lateral or side surface of the rim 116, and may be configured to engage a side surface or features of the rotary device 102.

The orientation of the traction elements 122A-122D, 124A-124D may be modified to engage the rotary device 10 better. For example, a plurality of the traction elements 122A-122D may be arranged obliquely relative to the axis A-A, or the plurality of traction elements 122A-122D may be arranged to extend in variable angles relative to the axis A-A. The plurality of traction elements 124A-124D may be arranged coaxially relative to the axis A-A, or the plurality of traction elements 124A-124D may be arranged obliquely relative to the axis A-A.

The individual traction elements may be formed in different configurations according to their location, orientation, and corresponding profiles of the rotary device. For example, the plurality of traction elements 122A-122D, 124A-124D may be defined as a plurality of teeth 128. The plurality of traction elements 122A-122D, 124A-124D may also be formed as a plurality of protrusions 126 of different shapes or sizes.

The plurality of traction elements 122A-122D, 124A-124D may be formed integrally with the handle 102 and the coupler 104. The plurality of traction elements 122A-122D, 124A-124D may be arranged to interlock with a plurality of traction elements 26 formed by the rotary device 10, such as recesses formed by the rotary device 10 or vice versa.

The handle 102 may define a cresting peak 140 on a gripping side 132 of the handle 102 corresponding to the axis A-A. The coupler 104 may be arranged to be placed coaxially with the rotary device 10 and mutually engage therewith upon application of pressure by the adapter 100 against the rotary device 10. The handle 102 is adapted to rotate the rotary device 10 because of the mutual engagement of the coupler 104 with the rotary device 10. Rotation of the handle 102 simultaneously rotates the rotary device 10 about a common axis A-A. Not only does the increased diameter of the handle 102 relative to the coupler 104 provide improved leverage and ease rotating the rotary device 10, but the handle 102 also facilitates easier gripping by a user.

FIG. 5 illustrates another embodiment of an adapter 150. In this embodiment, the coupler 154 preferably has a height greater than the handle 152, which allows for greater stacking or distancing of the adapter 150 from the article upon which a corresponding rotary device is mounted, and without making the handle 152 too thick for adjustment. The adapter 150 defines a cavity 156 having a spacer 160 protruding from an upper portion 158 of a cavity wall 159 and generally defined along an axis B-B. As the spacer 160 protrudes short of a height H6 between the spacer 160 and a bottom 166 of a rim 162, the handle 152 can be better elevated from the article with the rotary device abutting the spacer 160.

The height H6 may generally correspond to a height of the rotary device 10. The height H6 may be longer than a height of the spacer 160, or vice versa, depending on the extent it is desired to elevate the handle 152 relative to the article. The adapter 150 includes an interior surface of the rim 162 defining a plurality of traction elements 164 formed by teeth generally extending parallel to the axis B-B and configured for releasably engaging an outer surface of the corresponding rotary device. The traction elements 164 may be arranged as teeth and/or in sufficient numbers and frequency to allow a user to releasably attach the adapter 150 to the corresponding rotary device in substantially any configuration or degree of rotation, thereby significantly simplifying the design and use of the adapter 150.

Figure 6:
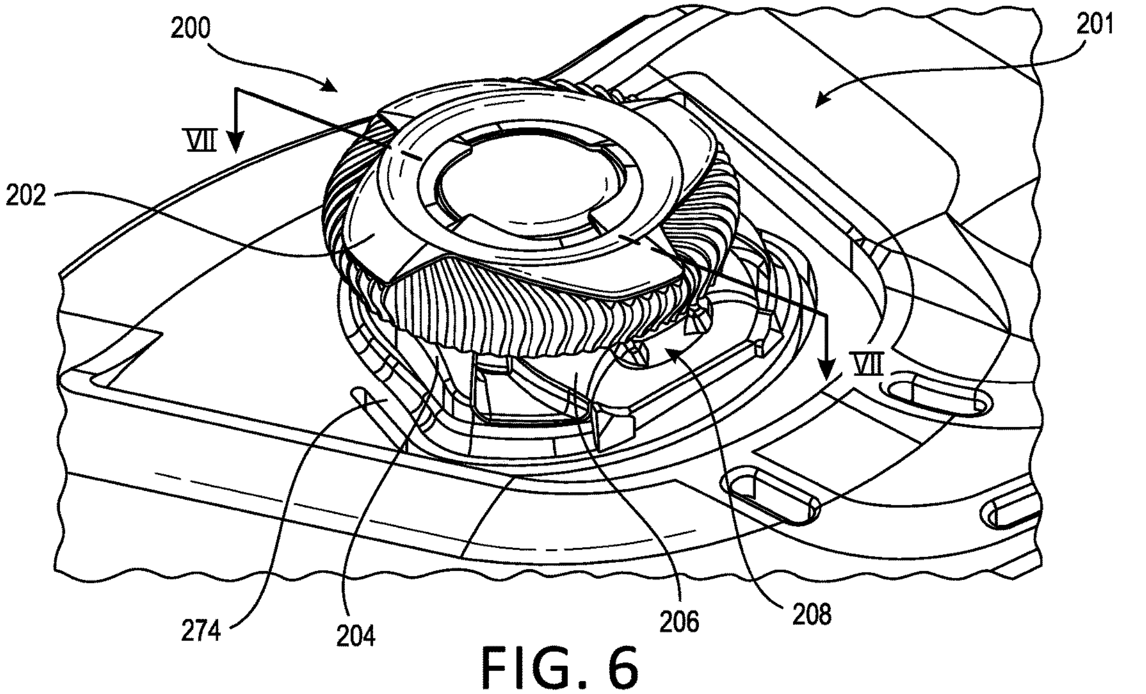
FIG. 6 is a perspective view of a mounting system for a rotary device on a frame member of an article.

FIG. 6 exemplifies a mounting system 200 for coupling a rotary device 202 to a frame member 201 of an article. The rotary device 202 may be of any of the devices described herein, and an exemplary frame member is found in U.S. patent application publication nos. 2017/0348131, published on Dec. 7, 2017, and 2019/0105188, published Apr. 11, 2019, which are incorporated herein by reference. As the rotary device 202 may be a standard part and sold in mass quantity as an off-the-shelf component, the frame member 201 may be adapted with coupling features to engage corresponding standard coupling features of the rotary device 202. However, corresponding coupling features of the rotary device 202 and the frame member 201 may not be suitable to securely lock the rotary device 202 to the frame member 201.

One drawback is that the frame member 201 may not be suitably rigid to retain the rotary device 202 firmly, particularly at desired and/or necessary levels of tension. This drawback is evident in certain applications with frame members of orthopedic devices with flexibility or which are semi-rigid to adapt to a contour of a leg. In the past, adhesives or stitching of the rotary device 202 to the frame member 201 has been a standard process, but it is desirable to eliminate these means to create means for coupling that provides better assurance that the connection between the rotary device 202 and the frame member 201 will be maintained over repeated use, and to simplify the manufacturing process. It is also desirable to provide means that enable removal of the rotary device 202 from the frame member 201 for maintenance or replacement of the rotary device 202.

To surmount drawbacks in known mounting systems, a connector 208 is provided to secure the connection between the rotary device 202 and the frame member 201. The rotary device 202 has coupling features 204 that engage with coupling features 206 of the frame member 201. The connector 208 cooperates with the coupling features 204, 206 of the rotary device 202 and the frame member 201 to ensure that the rotary device 202 is securely retained on the frame member 201. The connector 208 may be formed from a more rigid material than the frame member 201, and/or may have dimensional qualities, such as greater thickness, that result in a more stable structure than the frame member 201, for example to withstand interacting forces between the frame member 201 and the rotary device 202, such as tension applied by the rotary device 202 to an elongate tension element.

Figure 7:
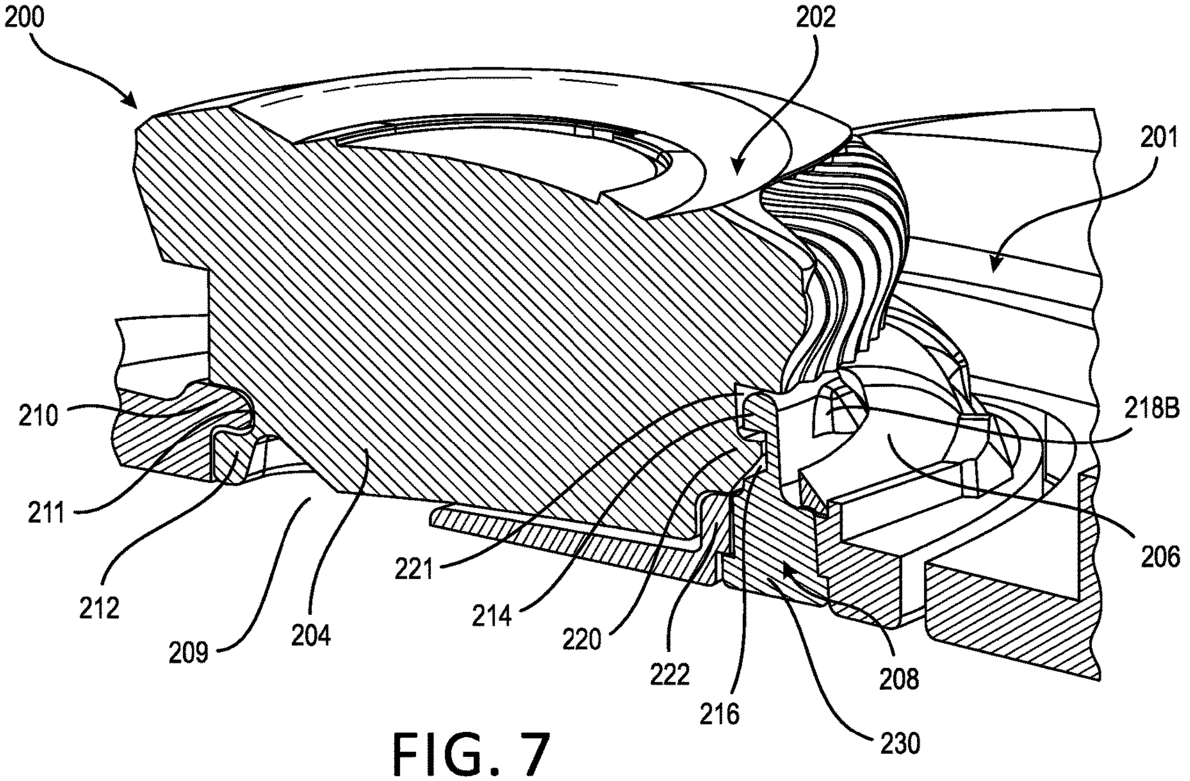
FIG. 7 is a cross-sectional view taken along line VII-VII of the mounting system of FIG. 6.
Figure 8A:
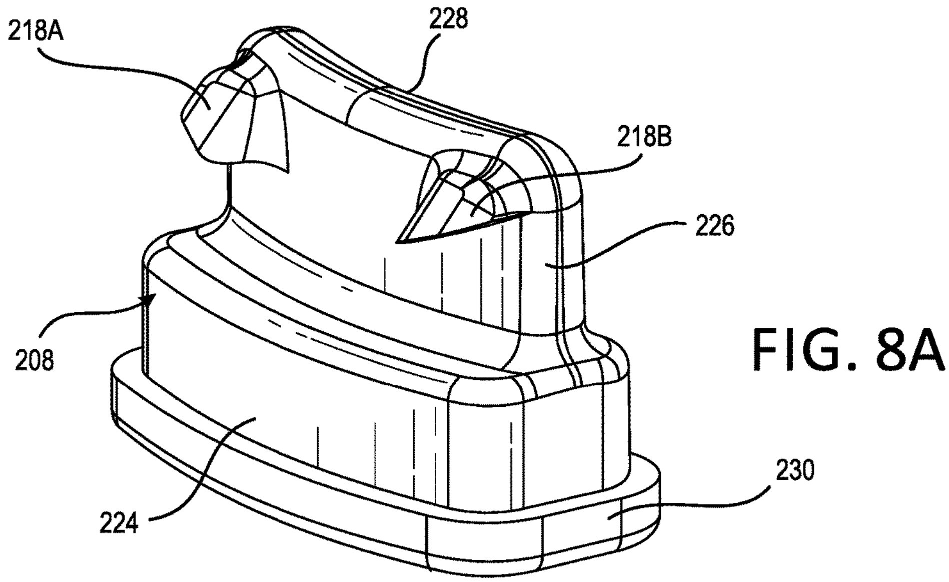
FIG. 8A is a perspective view of a connector in the mounting system of FIG. 6.
Figure 8B:
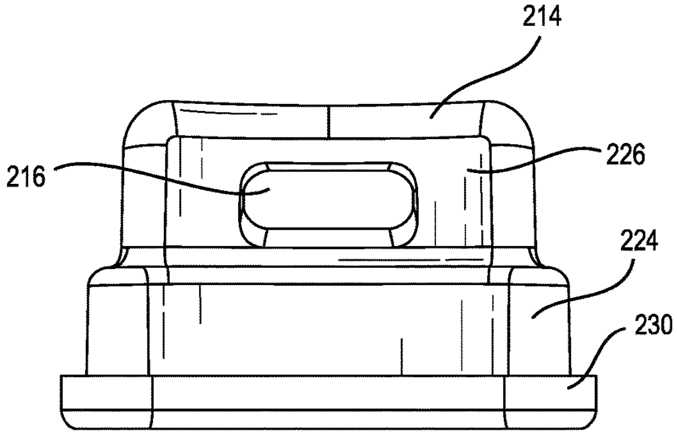
FIG. 8B is an elevational view of a first side of the connector of FIG. 8A.
Figure 8C:
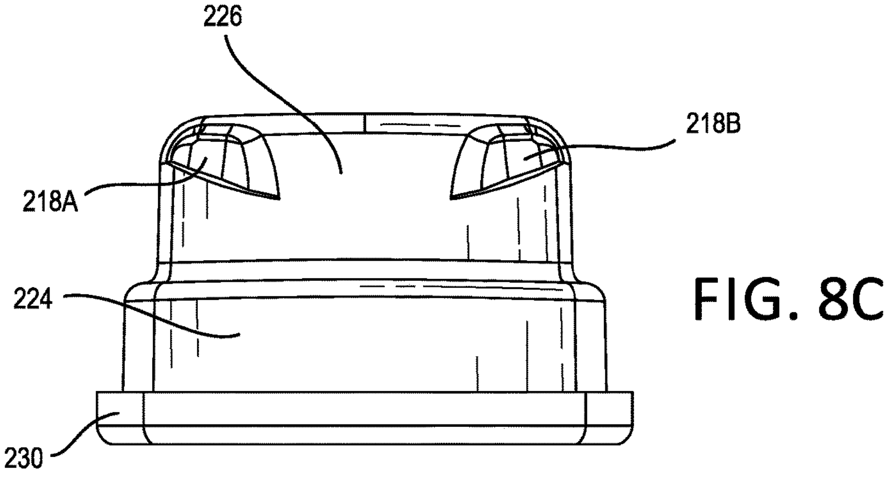
FIG. 8C is an elevational view of a second side of the connector of FIG. 8A.

FIG. 7 shows an exemplary mounting system 200. The frame member 201 defines coupling features such a peripheral tab 210 extending about at least a portion of an opening 209 into which coupling features 204 of the rotary device 202 extend. The peripheral tab 210 may engage a corresponding and/or complementary peripheral groove 211 of the rotary device 202. A peripheral lip 212 of the rotary device 202 bordering the peripheral groove 211 may be biased against the peripheral tab 210. While these coupling features 204, 206 of the rotary device 202 and the frame member 201 interact with and correspond to one another, they may be provided to oppositely engage relative to the coupling provided by the connector 208, and retain the rotary device 202 within the opening 209 in a stable condition by forming a snap-fit.

As shown in FIG. 7 and FIGS. 8A-8C, the connector 208 may be configured to be retained by and fit with coupling features 206 of the frame member 201, and correspondingly engage the coupling features 204 of the rotary device 202. The connector 208 may have a first lip 214 bordering a recess 216 adapted to receive a protruding coupling part 220 of the coupling features 204 of the rotary device 202. The recess 216 may be formed along a first side of an extension 226 from a base 224 of the connector 208.

The first lip 214 may be accepted by or cooperate with a second peripheral groove 221 defined by the rotary device 202. While the recess 216 and the first lip 214 are shown in FIG. 7 with the first lip 214 extending above or outwardly from the recess 216, the depicted arrangement is exemplary and is by no means limiting. More or fewer recesses, lips, peripheral grooves, and other features may be provided as suitable and in any suitable configuration.

In the disclosed example, the base 224 and extension 226 have an arcuate profile 228 generally corresponding to a shape of the opening 209. The connector 208 is not limited to an arcuate profile 228, and it may be configured according to the coupling features 204, 206, the opening 209, the frame member 201, or otherwise.

The connector 208 may have first and second latches 218A, 218B on a second side of the extension 226 and engageable with the coupling features 206 of the frame member 201 and cooperating with the coupling of the coupling part 220 of the rotary device 202, thereby stabilizing and serving intermediate to both the frame member 201 and the rotary device 202. The connector 208 may form a base periphery 230 adapted to be retained by corresponding portions 222 of the coupling features 206 of the frame member 201. In embodiments, the corresponding portions 222 may be formed as a biasing part.

The extension 226 is arranged to be inserted through the corresponding portions 222 of the coupling features 206 of the frame member 201 to clasp or retain the coupling features 204, 206 of the rotary device 202 and the frame member 204 as the extension 226 is inserted. The base periphery 230 is preferably flush with a surface of the frame member 201 so as not to protrude beyond the frame member 201, thereby minimizing bulk, improving reliability, and optimizing comfort and aesthetics. The frame member 201 may be adapted with suitable biasing or retaining features to assure stable retention of the base 224 and the base periphery 230 relative to the frame member 201 while permitting the extension 226 to snap-fit to the coupling features 204, 206 of the rotary device 202 and the frame member 201.

The depicted coupling features 204, 206 of both the frame member 201 and the rotary device 202 are merely exemplary, and the mounting system 200 is not limited to the depicted features. The connector 208 is arranged, however, to accommodate the coupling features 204, 206 and to form a corresponding snap-fit to preferably both the rotary device 202 and the frame member 201, thereby forming a secure connection. The connector 208 may be adapted to be removed from the coupling features 204, 206, such as biasing the latches and or lip away from the coupling features 204, 206. However, such removal may require substantial exertion on the connector compared to normal use, so during normal use, the snap-fit connection is assuredly stable from inadvertent motion and resists decoupling.

Figure 9:
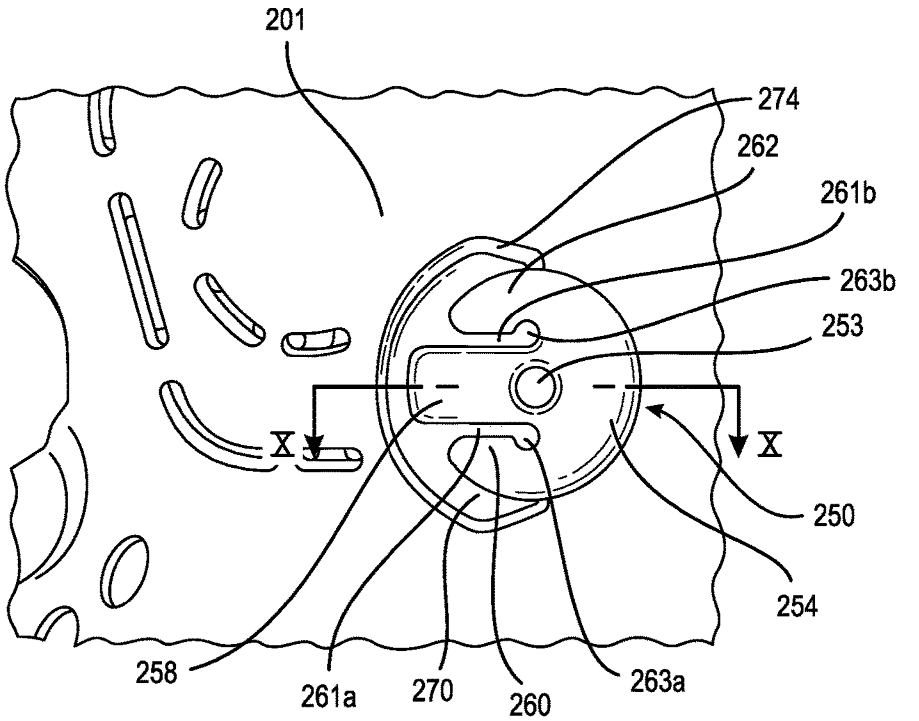
FIG. 9 is a perspective view of another embodiment of a mounting system.
Figure 10:
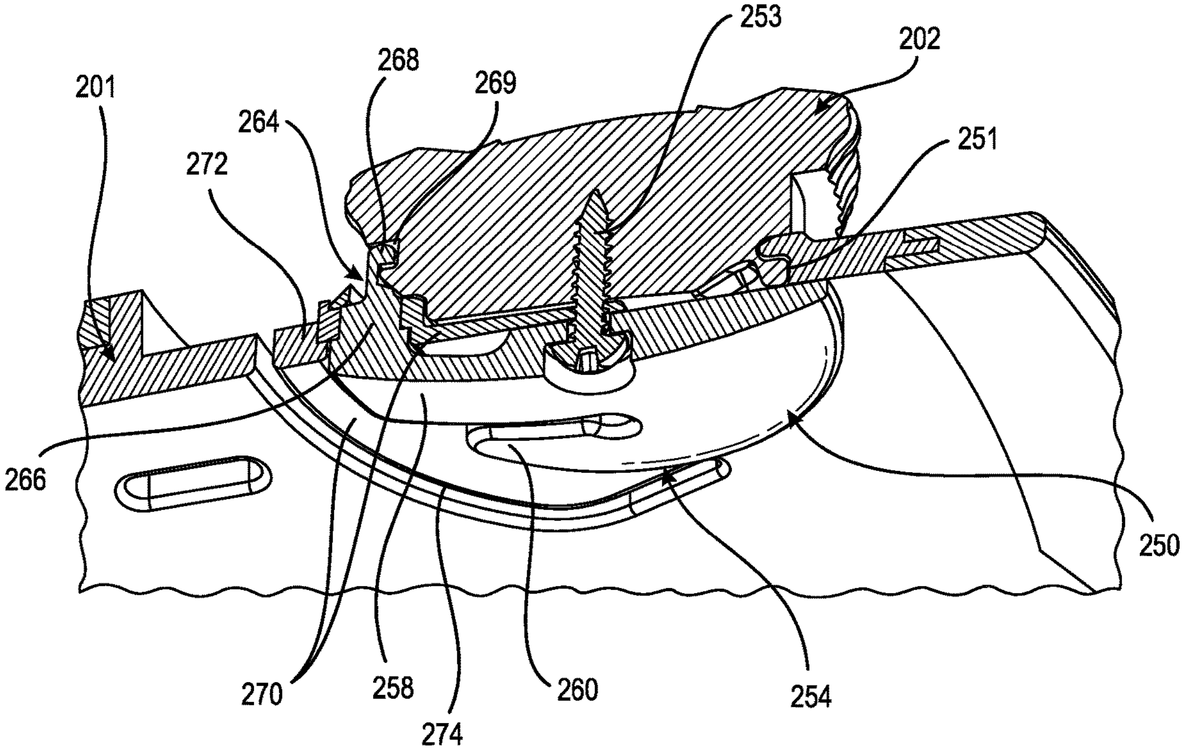
FIG. 10 is a cross-sectional view taken along line X-X in the mounting system of FIG. 9.

Referring to FIGS. 9 and 10, another embodiment of connector 250 is provided to offer a robust connection of the rotary device 202 to the frame member 201 of the embodiment of FIGS. 6-8C. The connector 250 includes a plate 254 secured to the rotary device 202 by a fastener 253 that extends through a thickness of the plate 254, the frame member 201, and into a thickness of the rotary device 202 and an intermediate part 264. The plate 254 is adapted to extend along an inner side of the frame member 201 on the opposite side of the rotary device 202. The rotary device 202, aside from the fastener 253, is coupled similarly to a periphery 272 of an engagement section 270 of the frame member 201, as in the embodiment of FIGS. 6-8C, for example at a lip portion 251.

The plate 252 has a central flange 258 that carries the intermediate part 264, which generally extends perpendicularly from the central flange 258 toward the rotary device 202 to engage the rotary device 202 with at least one lip 268 projecting therefrom to engage a peripheral groove 269 defined by the rotary device 202, as in the embodiment of the connector 208 of FIGS. 6-8C. The intermediate part 264 may be formed similarly to the connector 208 aside from a base 266 (as the base 224) extending from the central flange 258.

The plate 252 further includes first and second flanges 260, 262, which flank the central flange 258 and reinforce the intermediate part 264 and provide flexibility. An elongate clearance 261*a* is located between the central and first flange 258, 260 and a base opening 263*a*. A similar arrangement is provided between the central and second flanges 258, 262 with an elongate clearance 261*b* and a base opening 263*b*. The clearances 261*a*, 261*b* aid in providing flexibility, while the central, first and second flanges 258, 260, 262 provide rigidity similar to or the same as the frame member 201 and reinforce the rotary device 202 upon use. The flanges 258, 260, 262 extend short of a tension relief slot 274 defined through a thickness of the frame member 201, and which itself serves as a flange extending from the frame member 201, as taught in U.S. patent application publication no. 2017/0348131.

The adapter for a rotary system according to the disclosed embodiments advantageously addresses the challenges of rotary systems being poorly adapted to be gripped and regulated by a user, particularly if the user has limited dexterity, eyesight, or due to difficulties with regulating a rotary device while the rotary device is being worn on the user's body. The adapter for a rotary system according to the embodiments advantageously provides increased leverage and clearance from a frame member and provides improved indicia for accurately regulating a rotary device for compliant use.

The embodiments disclosing a connector and/or a mounting system for better securing a rotary device to a frame member of a device advantageously address the problem of rotary devices being glued or similarly adhered to a frame member, and thus being difficult to accurately, consistently, and removably secure a rotary device to a surface. The connector and mounting system embodiments provide a secure, intuitive, and precise solution for releasably securing a rotary device to a surface.

It is to be understood that not necessarily all objects or advantages may be achieved under an embodiment of the disclosure. Those skilled in the art will recognize that an adapter for a rotary system may be embodied or carried out so it achieves or optimizes one advantage or group of advantages as taught herein without achieving other objects or advantages as taught or suggested herein.

The skilled artisan will recognize the interchangeability of various disclosed features. Besides the variations described herein, other known equivalents for each feature can be mixed and matched by one of ordinary skill in this art to build and use an adapter for a rotary system under principles of the present disclosure. It will be understood by the skilled artisan that the features described herein may be adapted to other methods and types of adapters, rotary systems, and devices.

Although this disclosure describes certain exemplary embodiments and examples of an adapter for a rotary system, it will be understood by those skilled in the art that the present disclosure extends beyond the specifically disclosed adapters for rotary systems to other alternative embodiments and/or uses of the disclosure and obvious modifications and equivalents thereof, including other types and components of various devices, including orthopedic, prosthetic, medical, and otherwise. It is intended that the present disclosure should not be limited by the disclosed embodiments described above and may be extended to other applications that may employ the features described herein.

The invention claimed is:

1. A system including a rotary device and an adapter arranged to secure to the rotary device, the rotary device having a first axis and the adapter having a second axis arranged to be placed in alignment with the first axis of the rotary device, the adapter comprising:

a handle having a width greater than a width of a knob of the rotary device and rotatable about the second axis;

a coupler extending from and coaxial with the handle, and adapted to engage the knob of the rotary device, the coupler oriented coaxially with the handle along the second axis;

wherein the adapter defines a cavity defined about the second axis and extending from an engagement side into the coupler, the coupler including a rim coaxial with the second axis and surrounding at least part of the cavity;

wherein a periphery of the rim defines at least first and second traction elements generally extending radially relative to the second axis and spaced apart from one another about the rim; and wherein the first and second traction elements each define a plurality of teeth extending coaxially relative to the second axis.

2. The system of claim 1, wherein the handle and the coupler are formed as a monolithic single mass of material integrally and continuously formed to define the handle and the coupler.

3. The system of claim 1, wherein the handle defines indicia arranged for indicating a rotational direction for rotating the handle.

4. The system of claim 1, wherein the handle defines a profile forming a grip about a periphery of the handle.

5. The system of claim 1, wherein the handle defines at least one opening arranged for receiving an attachment element.

6. The system of claim 1, wherein the handle has a diameter greater than a diameter of the coupler.

7. The system of claim 1, wherein the coupler has a diameter greater than a diameter of knob of the rotary device.

8. The system of claim 1, wherein the handle has a height greater than a height of the coupler, the coupler has a height greater than a height of the knob of the rotary device, and the adapter has a height arranged at least twice the height of the knob of the rotary device.

9. The system of claim 1, wherein the rim defines an outer diameter of the coupler, the cavity has a diameter proximate to the diameter of the knob of the rotary device, wherein a height of the rim defines a height of the coupler.

10. The system of claim 1, wherein the handle forms an axial overhang coaxially extending at least along the rim.

11. The system of claim 1, wherein the cavity defines a top portion extending at least into the handle or within a height of the handle.

12. The system of claim 1, wherein a top portion of the cavity defines a profile adapted to correspond or proximate in shape to a top portion of the knob of the rotary device and adapted to facilitate traction with the top portion of the knob of the rotary device.

* * * * *